US010063313B1

(12) United States Patent
Al Sayeed et al.

(10) Patent No.: US 10,063,313 B1
(45) Date of Patent: Aug. 28, 2018

(54) SYNCHRONIZATION OF OPTICAL PROTECTION SWITCHING AND LOADING OF PATH SPECIFIC CHARACTERISTICS

(71) Applicant: Ciena Corporation, Hanover, MD (US)

(72) Inventors: Choudhury A. Al Sayeed, Stittsville (CA); Dave C. Bownass, Ottawa (CA); Darren Hennigar, Nepean (CA); Vipul Bhatnagar, Kensington, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/444,432

(22) Filed: Feb. 28, 2017

(51) Int. Cl.
*H04B 10/032* (2013.01)
*H04B 10/079* (2013.01)
*H04Q 11/00* (2006.01)
*H04L 7/00* (2006.01)

(52) U.S. Cl.
CPC ..... *H04B 10/032* (2013.01); *H04B 10/07955* (2013.01); *H04L 7/0075* (2013.01); *H04Q 11/0005* (2013.01); *H04Q 2011/0015* (2013.01); *H04Q 2011/0043* (2013.01)

(58) Field of Classification Search
CPC ............ H04B 10/032; H04B 10/07955; H04Q 11/0005; H04Q 2011/0043; H04Q 2011/0015; H04L 7/0075
See application file for complete search history.

(56) References Cited

U.S. PATENT DOCUMENTS

| 6,057,948 | A | 5/2000 | Mizrahi |
| 7,174,096 | B2 | 2/2007 | Berthold et al. |
| 8,078,052 | B2 | 12/2011 | Aprile et al. |
| 2004/0008988 | A1* | 1/2004 | Gerstal ............... H04B 10/032 398/45 |
| 2006/0115266 | A1 | 6/2006 | Levi et al. |
| 2011/0200324 | A1 | 8/2011 | Boertjes et al. |
| 2011/0222846 | A1 | 9/2011 | Boertjes et al. |
| 2016/0173225 | A1 | 6/2016 | Cavaliere et al. |

* cited by examiner

*Primary Examiner* — Leslie C Pascal
(74) *Attorney, Agent, or Firm* — Clements Bernard Walker PLLC; Christopher L. Bernard; Lawrence A. Baratta, Jr.

(57) ABSTRACT

Systems and methods describe synchronizing optical protection switching with an Optical Protection Switch (OPS) including a splitter on a transmit side to both a first fiber path and a second fiber path and a receive switch and monitoring port on a receive side with the receive switch set to only one of the first fiber path and the second fiber path. A method includes, responsive to detection of a fault on the first fiber path, generating a link Forward Defect Indication (FDI) and transmitting the link FDI over a messaging channel downstream; and utilizing the link FDI to generate an Optical Protection Switch Indicator (OPSI) status used by the OPS to cause a switch of the receive switch to the second fiber path.

20 Claims, 5 Drawing Sheets

SYNCHRONIZATION OF OPTICAL PROTECTION SWITCHING AND LOADING OF PATH SPECIFIC CHARACTERISTICS

FIELD OF THE DISCLOSURE

The present disclosure generally relates to optical networking systems and methods. More particularly, the present disclosure relates to synchronization of optical protection switching and loading of path specific characteristics.

BACKGROUND OF THE DISCLOSURE

Protection switching in optical networks enables redundancy and resiliency to fiber cuts or other failures. At Layer 1, e.g., Time Division Multiplexing (TDM) such as Synchronous Optical Network (SONET), Synchronous Digital Hierarchy (SDH), etc., protection switching occurs in the electrical domain (Layer 1) via synchronous signaling. Specifically, there are dedicated bytes in the frame overhead assigned for the purpose of signaling local switch status (switch state, status of working and protection lines, scheduled switch events, etc.) to a remote end. This provides the infrastructure for a bidirectional switching capability that keeps duplex traffic flows on the same path in electrical domain. However, such synchronization framework in the optical domain does not exist. At Layer 0, e.g., optical, to protect fiber spans against line cuts, an Optical Protection Switch (OPS) is used in some configurations to get fast traffic restoration. An OPS typically contains an optical switch in the receiving direction that measures total power in both ports and switches from one port to another port based on loss of light (LOL) detected on that port. To protect fiber spans, OPS switch is placed in the receiving (RX) direction of the fiber spans, while the transmitting (TX) power to the fiber span is broadcasted to protect fiber paths using a power splitter on the OPS It is important to maintain synchronization in Layer 0 optical protection switching at OPSs at both ends of a link. In an optical network deployment, Layer 0 traffic is usually bi-directional. From a fiber path protection perspective, it is important to ensure that traffic in both directions experiences similar path losses and network elements in-between. This ensures that optical channels running bi-directionally have a similar traffic experience for optical performances in terms of Optical Signal-to-Noise Ratio (OSNR), non-linear penalties, Bit Error Rate (BER), latencies, and available margin. However, with the conventional OPS protection scheme, that cannot be ensured as following a fiber fault, optical channels in both directions can experience performance deltas for an extended period of time until the switch at the non-faulted end is manually switched.

Additionally, in such conventional protection schemes, protected fiber paths (or spans) are designed to be maximally diverse so that with a fault in one path, the other path can be operational with a fast optical switch. Following a fault such as a fiber cut in one path, when trucks are rolled out to re-splice the fibers, both the transmit (TX) and receive (RX) direction fiber-pairs are put into a maintenance state so that re-splicing can be done maintaining laser safety standards. With the conventional protection schemes, before such maintenance procedures, a protection switch at the non-faulted end has to be manually switched that triggers an unnecessary disruption in traffic. In other words, with the conventional protection schemes, physical efforts are required to ensure both fiber paths are identical in nature in terms of span loss, fiber type, physical deployment (e.g., aerial vs. ground fibers), while each fiber path is kept limited to a single span to minimize the path to path characteristics variations. In a real field deployment, with diversified fiber paths used in such OPS protection schemes, maintaining these constraints between two sets of fiber pairs is difficult to achieve.

A conventional approach for synchronization includes introducing an optical shutter in the TX direction. When the OPS switches on the RX port, it can also trigger a shutter off and on in the TX direction, that in turn, triggers a loss of light on the other end and hence, triggers a switch on the other end too. However, it is a more expensive solution as the shutter mechanism requires additional optical components, space, processing, and control. Moreover, this approach requires special handling on how long the shutter needs to be toggled between OFF and ON so that the switch on the other end sees the required loss of light for certain duration to move from one RX port to another. In addition, in some cases, due to enough Amplified Spontaneous Emission (ASE) loading on the path, the other end may not see the necessary loss of light to trigger the switch. Another drawback of using shutter/Variable Optical Attenuators (VOAs) on the OPS is from a reliability point of view. The OPS is a single point of failure for the services traversing it, and therefore it is advantageous to minimize the part count (and especially electrically active parts) for a low probability of failure. Due to this uncertainty, and due to the high dependency between pre-planned ASE estimation and actual network deployment, the expensive TX shutter based OPS hardware solution is not popular in field deployment.

BRIEF SUMMARY OF THE DISCLOSURE

In an exemplary embodiment, a method of synchronizing optical protection switching is described with an Optical Protection Switch (OPS) including a splitter on a transmit side to both a first fiber path and a second fiber path and a receive switch and monitoring port on a receive side with the receive switch set to only one of the first fiber path and the second fiber path. The method includes, responsive to detection of a fault on the first fiber path, generating a link Forward Defect Indication (FDI) and transmitting the link FDI over a messaging channel downstream; and utilizing the link FDI to generate an Optical Protection Switch Indicator (OPSI) status used by the OPS to cause a switch of the receive switch to the second fiber path. The method can further include utilizing the OPSI status to load path specific parameters associated with the second fiber path. The path specific parameters can include settings on transceivers for any of Polarization Mode Dispersion (PMD), Dynamic Group Delay (DGD), Polarization Dependent Loss (PDL), required line and baud rate, viable modulation formats, and transmit power to be used for the second fiber path. The method can further include monitoring power by the monitoring port and utilizing the OPSI status to indicate a change in gain of a pre-amplifier based on a measured power difference. In a transmit direction, the path specific parameters can include one or more of amplifier gain and actuator settings for each path, wherein the path specific parameters are saved during installation, and wherein the path specific parameters are loaded based on the OPSI status.

The method can further include preventing a switch of the receive switch at a local node responsive to the detection of the fault and performing the switch of the receive switch based on the OPSI status. The method can further include receiving the OPSI status at a far end node and triggering a switch of the receive switch therein to a port noted in the OPSI status such that both a local node and the far end node are synchronized and on the second fiber path. The monitoring port can be utilized for the detection and the OPSI status is used for the switch of the receive switch. The messaging channel can include one of an Optical Supervisory Channel (OSC) and General Communication Channel (GCC) bytes in overhead. The detection can be from a receiving node on the first fiber path and the receiving node generates the link FDI and the OPSI status. The detection can be from an intermediate node on the first fiber path and the intermediate node generates the link FDI and a receiving node generates the OPSI status.

In another exemplary embodiment, an optical network with at least two nodes configured to synchronize optical protection switching with an Optical Protection Switch (OPS) includes a first node including a first OPS and a second node including a second OPS, each of the first OPS and the second OPS include a splitter on a transmit side to both a first fiber path and a second fiber path and a receive switch and monitoring port on a receive side with the receive switch set to only one of the first fiber path and the second fiber path, wherein the first node is configured to, responsive to detection of a fault on the first fiber path, generate a link Forward Defect Indication (FDI) and transmit the link FDI over a messaging channel downstream, and utilize the link FDI to generate an Optical Protection Switch Indicator (OPSI) status used by the first OPS to cause a switch of the receive switch to the second fiber path. The first node can be further configured to utilize the OPSI status to load path specific parameters associated with the second fiber path. The path specific parameters can include settings on transceivers for any of Polarization Mode Dispersion (PMD), Dynamic Group Delay (DGD), Polarization Dependent Loss (PDL), required line and baud rate, viable modulation formats, and transmit power to be used for the second fiber path.

The first node can be further configured to monitor power by the monitoring port and utilizing the OPSI status to indicate a change in gain of a pre-amplifier based on a measured power difference. The first node can be further configured to prevent a switch of the receive switch at a local node responsive to the detection of the fault and performing the switch of the receive switch based on the OPSI status. The second node can be configured to receive the OPSI status and trigger a switch of the receive switch therein to a port noted in the OPSI status such that both the first node and the second node are synchronized and on the second fiber path. The monitoring port can be utilized for the detection and the OPSI status is used for the switch of the receive switch. The messaging channel can include one of an Optical Supervisory Channel (OSC) and General Communication Channel (GCC) bytes in overhead.

In a further exemplary embodiment, an optical node configured to synchronize optical protection switching of an Optical Protection Switch (OPS) with another node includes the OPS including a splitter on a transmit side to both a first fiber path and a second fiber path and a receive switch and monitoring port on a receive side with the receive switch set to only one of the first fiber path and the second fiber path; a shelf processor communicatively coupled to the OPS; and a messaging channel system, wherein the optical node is configured to, responsive to detection of a fault on the first fiber path, generate a link Forward Defect Indication (FDI) and transmit the link FDI over the messaging channel system downstream, and utilize the link FDI to generate an Optical Protection Switch Indicator (OPSI) status used by the OPS to cause a switch of the receive switch to the second fiber path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, in various exemplary embodiments, the present disclosure relates to synchronization of optical protection switching and loading of path specific characteristics. Systems and methods described herein provide field-based Layer 0 restoration against optical fiber faults between two optical nodes protected with Optical Protection Switches (OPSs) and redundant optical fiber paths. More precisely, the systems and methods established a unique messaging framework between two OPS protected nodes against fiber path faults so that the fiber protection switching between the two nodes will always remain synchronized to the same fiber path. In addition, the systems and methods allow each OPS protected node to take the advantage of an OPS switching indication to set up path specific photonic parameters such as gain and loss settings on photonic actuators as well as pre-loading path specific characteristics such as dispersion, group delay, etc. on Dense Wavelength Division Multiplexing (DWDM) transponders so that following the switch from one fiber path to the other, similar optical performance can be achieved for traffic in both directions and receiver (RX) re-acquisition time can be minimized. The systems and methods not only synchronize protected fiber paths, but also ensures proper path specific settings (such as gain or loss targets) for photonic actuators so that on a switch from one path to another, no performance impact (due to overshoot or undershoot in power) is observed in downstream of the protected paths that can potentially be different in nature.

The messaging framework can operate over an Optical Supervisory (or Service) Channel (OSC), overhead communications channel, out-of-band communications channel, etc. The messaging framework ensures both ends of a link or spans have their OPSs synchronized. This messaging framework is for the optical switches, not for electrical switches. Also, the optical switches are not integrated with corresponding optical transceivers (TX/RX). Stated differently, any switch by the optical switches (OPSs) are not triggered by the TX/RX but rather by measuring power (i.e., the OPSs are distinct and separate from the optical transceivers). Further, the signaling between the optical switches over the messaging framework uses a communication channel that is out-of-band with respect to the traffic being protected. Advantageously, the messaging framework enables loading path specific actuators settings both photonic actuators and associated optical transceivers following an optical switch in the OPS to ensure guaranteed optical performance and minimized RX re-acquisition time.

Conventional OPS System

Figure 1:
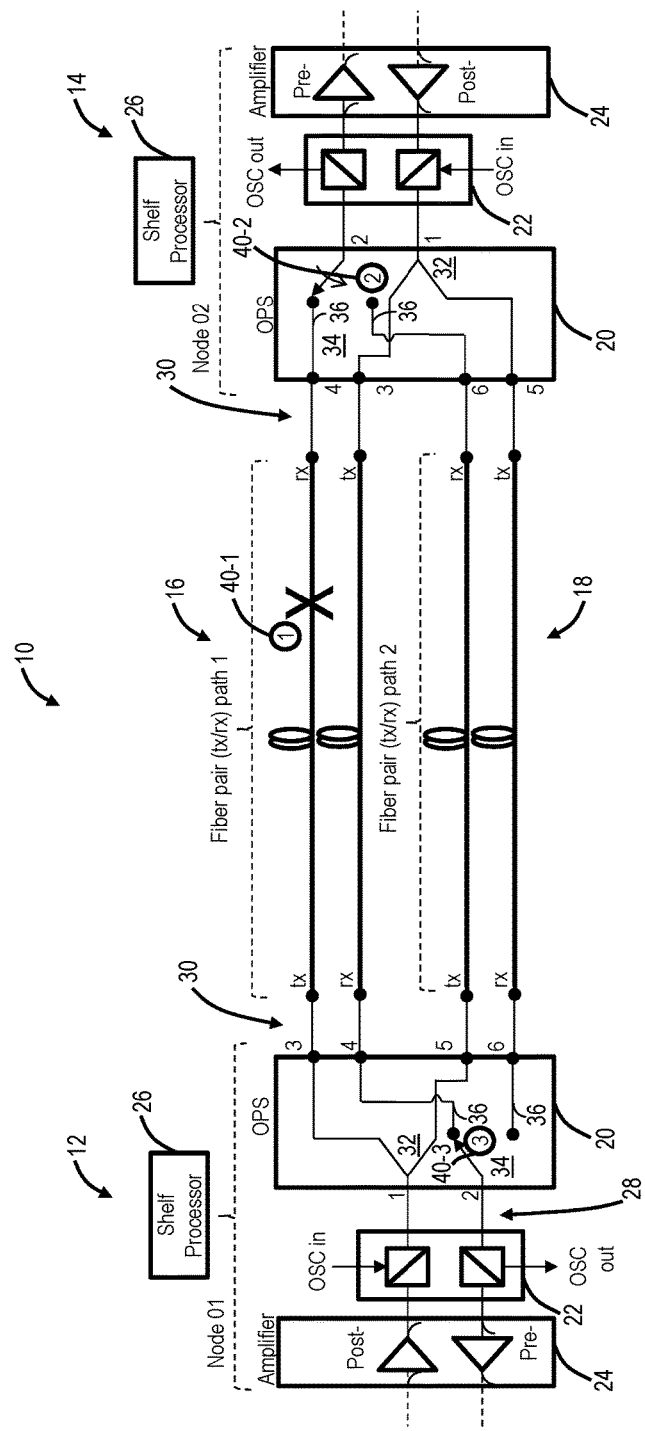
FIG. 1 is a network diagram of an optical network with OPS protected fiber spans between two nodes.

Referring to FIG. 1, a block diagram illustrates an optical network 10 with OPS protected fiber spans between two nodes 12, 14. The two nodes 12, 14 are interconnected by two fiber pairs, denoted as path 1 16, path 2 18. The paths 16, 18 can be diverse, even of differing lengths with intermediate equipment such as optical amplifiers (omitted in FIG. 1). The nodes 12, 14, each include an OPS 20, an Optical Supervisory Channel (OSC) 22, an amplifier 24, and a shelf processor 26. For illustration purposes, the optical transceivers which connect to the amplifiers 24 (either directly or through DWDM multiplexing equipment) are omitted. The amplifiers 24 can be Erbium Doped Fiber Amplifiers (EDFAs) or the like, acting as a post-amplifier on a transmit side and a pre-amplifier on a receive side. The OSC 22 can be an out-of-band (from the amplifier and/or from the DWDM channels) wavelength which provides Operations, Administration, Maintenance, and Provisioning (OAM&P) communication. For example, the OSC 22 can be at 1510 nm, 1625 nm, or the like. The OSC wavelength is added/dropped with filters in the OSC 22. Also, the OSC 22 can include transceiver components to enable the OSC wavelength and electrical components for modulating/demodulating the OSC wavelength.

Thus, after the optical transceivers (not shown), the amplifier 24, and the OSC 22, there is a single pair of signals 28—TX and RX—which interface the OPS 20. Functionally, the OPS 20 takes the single pair of signals 28 and presents two pairs of signals 30, one for each of the paths 16, 18. Thus, the function of optical protection is to interface a single transceiver with optical line protection over the paths 16, 18. To support this optical protection, on the transmit side, the OPS 20 includes a splitter 32 which splits the transmit signal from the signals 28 to fibers in each of the paths 16, 18. Thus, the OPS 20 includes transmitting actively over both of the paths 16, 18. On the receive side, the OPS 20 includes a switch 34 which selects only one fiber from each of the paths 16, 18 based on a monitoring port 36. Specifically, a Loss of Light (LOL) on the monitoring port 36 causes the switch 34 to toggle.

In operation, when a fiber cut (i.e., an optical line fail (OLF)) takes place on the active fiber path (step 40-1), the active OPS RX port at the node 14, where the switch is currently set (e.g. port #4 for the signals 30) goes into a loss of light (LOL) state, the OPS 20 does an automatic switch to the other RX port (e.g. port #6 for the signals 30) (step 40-2). However, in the reverse direction, since the node 12's OPS 20 active RX port #4 does not experience a LOL condition, the switch remains set at its current location (port #4) (step 40-3). That brings the switch ports at both ends switched at different fiber paths 16, 18 that could potentially be different in length, fiber-type, span loss, or even from network topology perspective (i.e., one path may contain more network elements than the other path).

Messaging Framework Process

Figure 2:
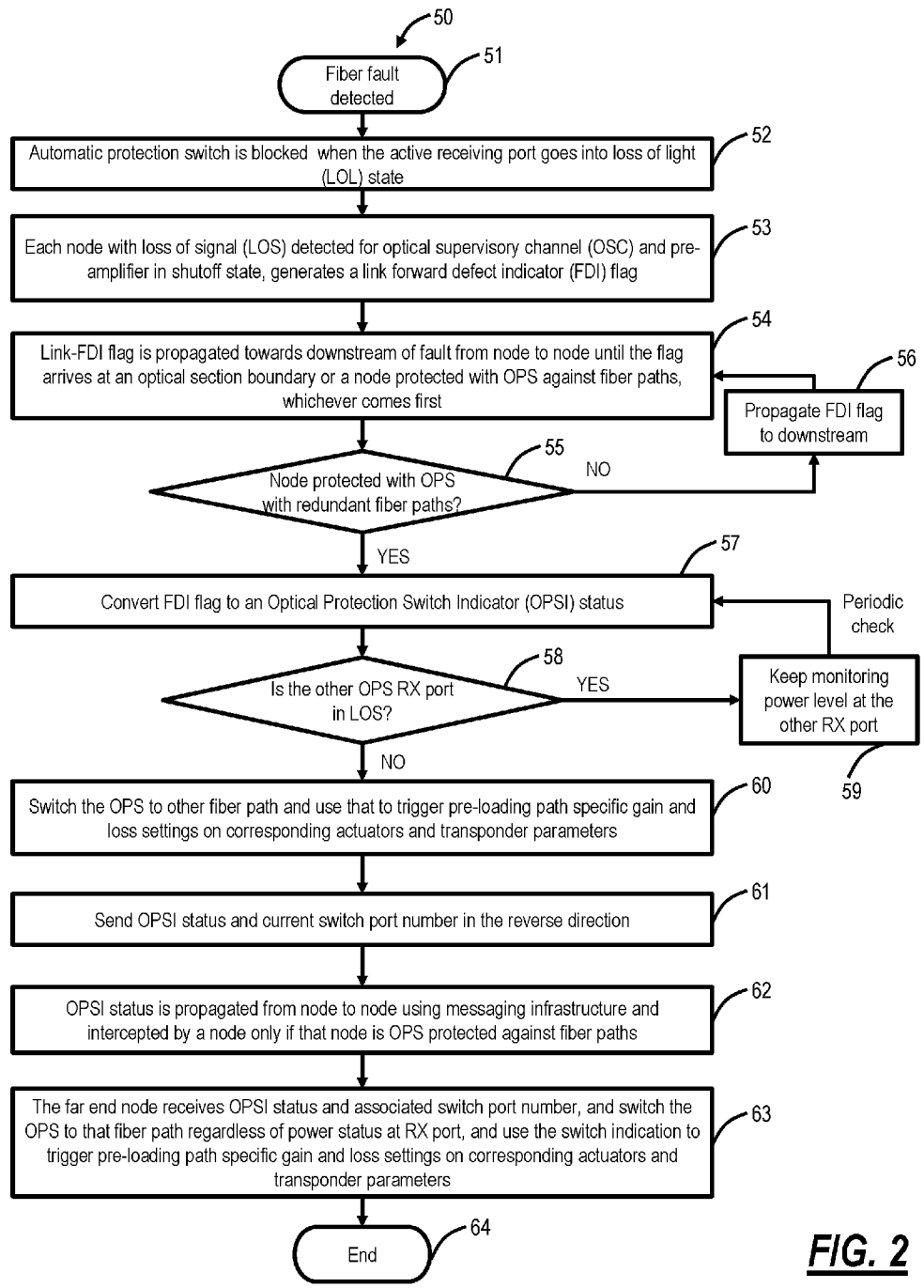
FIG. 2 is a flowchart of a messaging framework process for use in the optical network of FIG. 1 with the OPSs.

Referring to FIG. 2, in an exemplary embodiment, a flowchart illustrates a messaging framework process 50 for use in the optical network 10 with the OPSs 20. The systems and methods establish a messaging framework between OPS protected nodes 12, 14 against fiber paths so that the fiber protection switching between the two nodes 12, 14 will always remain in-sync to the same fiber path 16, 18. The messaging framework process 50 allows each OPS protected node to take advantage of an OPS switching indication to setup the path specific photonic parameters. The path specific photonic parameters can include target gain settings on the pre- and post-amplifiers, per channel actuator settings if the OPS 20 is associated with an OADM node both for the mux and demux directions, and path specific restoration and acquisition settings on the optical transceiver, if the optical transceiver is associated with the OPS protected nodes 12, 14. Such settings on the optical transceiver include pre-saving path specific characteristics for receivers (RX) such as Polarization Mode Dispersion (PMD), Dynamic Group Delay (DGD), Polarization Dependent Loss (PDL), or path specific requirements for transmitters (TX) such as required line and baud rate, viable modulation formats, transmit power to be used for one fiber path versus the other, and loading up the path specific settings on the optical transceiver in sync with the OPS 20 switching from one path to the other. This helps to reduce RX re-acquisition time significantly as well as allows the optical transceiver to be setup in a configuration protected by the OPS 20 against line fiber faults with diversified optical paths 16, 18 both in terms of length, fiber type, and topology.

In FIG. 1, the messaging framework process 50 works on the nodes 12, 14 with the OPS 20 protecting against two or more fiber paths 16, 18 with each path 16, 18 including a TX and RX fiber. The messaging framework process 50 and the OPS 20 deal with fiber faults such as line fiber cuts or the like. The messaging framework process 50 operates between the OPS 20, the OSC 22, the amplifier 24, the shelf processor 26, and the associated optical transceivers. Specifically, the OPS 20 provides detection and switching functionality for the optical protection, and the OPS 20 is communicatively coupled to the shelf processor 26. The shelf processor 26 is a nodal controller associated with the nodes 12, 14 and configured to perform OAM&P functionality associated with the nodes 12, 14. The shelf processor 26 is also communicatively coupled to the OSC 22 for communication with adjacent nodes and their shelf processors 26. The shelf processor 26 is further communicatively coupled to the amplifiers 24 and optical transceivers for distribution of the path specific photonic parameters.

The messaging framework process 50 initiates with detection of a fiber fault by a detecting node (step 51). The fiber fault is detected by the OPS 20, such as by the monitoring port 36 detecting a loss of light, bit errors, or some other condition. The messaging framework process 50 includes an automatic protection switch by the OPS 20 is blocked when the active receiving port goes into a Loss of Light (LOL) state (step 52). Thus, with the messaging framework process 50, the OPS 20 protection switch is not automatic, but only after synchronization/signaling with the far end. After blocking the protection switch, the messaging framework process 50 includes each node with Loss of Signal (LOS) detected over the OSC 22 or with the pre-amplifier in a shutoff state generating a link Forward Defect Indicator (FDI) flag (step 53). The link FDI flag is propagated towards downstream of the fault from node to node until the flag arrives at an optical section boundary or a node protected with the OPS 20 against fiber paths, whichever comes first (step 54). At this boundary or node receiving the link FDI flag, if this is not protected with the OPS 20, the link FDI flag continues to propagate downstream (step 56).

Once the node ("receiving node") receives the link FDI flag at the remote end, the link FDI flag is converted to an Optical Protection Switch Indicator (OPSI) status (step 57). The OPSI status is to communicate the fault to the OPS 20, basically converting the link FDI from the OSC 22 to commands for the OPS 20. The receiving node checks if the other OPS 20 RX port is in an LOS state (step 58), and if so, the receiving node keeps monitoring the power level on the other RX port (step 59). Specifically, the receiving node can periodically check that the other RX port is available, but there is no reason to switch if the other RX port is in the LOS state. If the other RX port is not in the LOS state (step 58), the receiving node switches the OPS 20 to the other fiber path and uses that to trigger pre-loading path specific gain and loss settings on the corresponding actuators and transponder parameters (step 60).

The receiving node sends the OPSI status and the current switch port number in the reverse direction (step 61). This ensures synchronization between the detecting node and the receiving node. The OPSI status is propagated from node to node using the messaging infrastructure (e.g., the OSC 22) and intercepted by a node only if that node is OPS protected against fiber paths, i.e., the detecting node (step 62). The far end node, the detecting node, receives the OPSI status and associated switch port number, and switches the OPS 20 to that fiber path regardless of power status at RX port, and uses the switch indication to trigger pre-loading path specific gain and loss settings on corresponding actuators and transponder parameters (step 63). Finally, the messaging framework process 50 ends (step 64).

Conventionally, the OPS 20 automatically switches as soon as the receiving port, where the switch is currently set, goes into LOS or LOL state i.e. the measured power level goes below a certain threshold. The messaging framework process 50 stops the automatic OPS switch based on local detection of the LOL, LOS, etc. and instead relies on messaging between the nodes 12, 14 that are OPS 20 protected with each other against redundant fiber paths following fiber faults on the active path. This messaging synchronizes the OPS 20 switching to trigger the switch from the faulted path to the other path.

Exemplary Operations of the Messaging Framework Process

Figure 3:
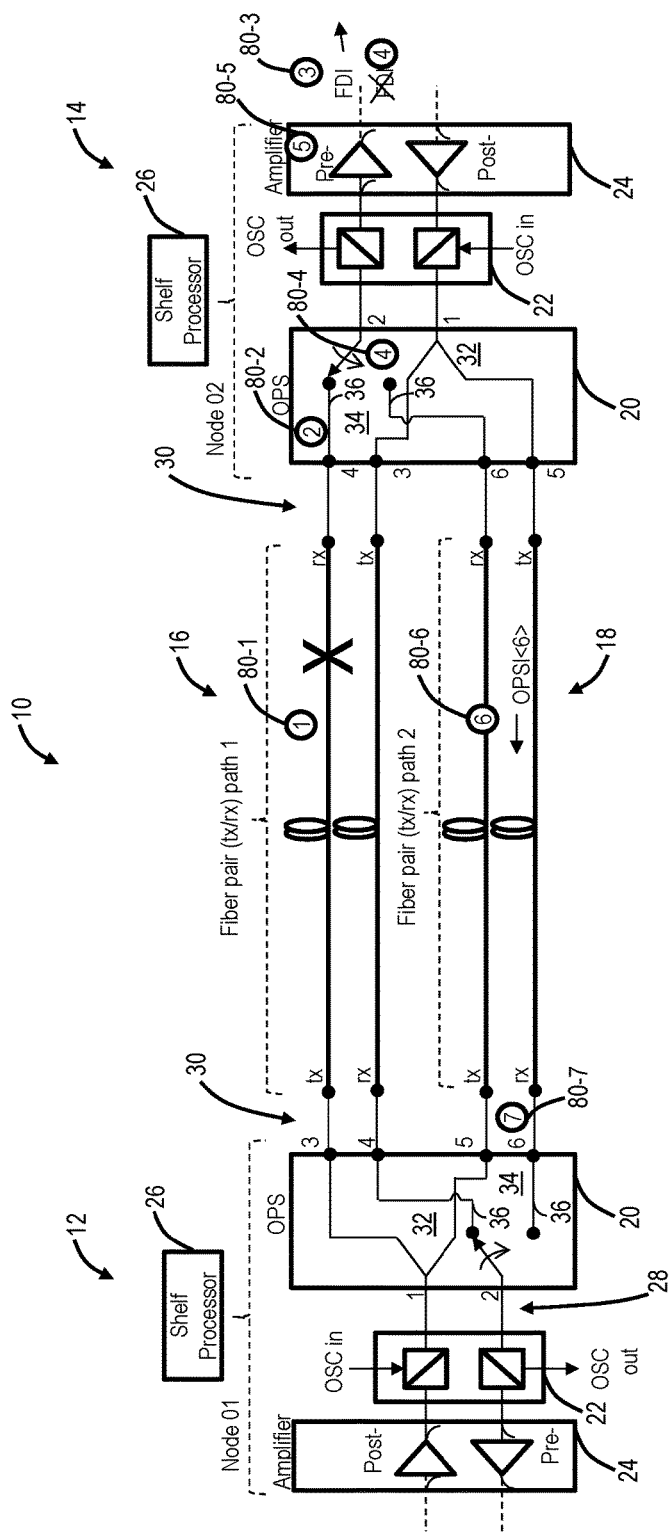
FIG. 3 is a network diagram of the network of FIG. 1 implementing the messaging framework process of FIG. 2.

Referring to FIG. 3, in an exemplary embodiment, a network diagram illustrates the network 10 implementing the messaging framework process 50. FIG. 3 illustrates the same network 10 as in FIG. 1 where the fiber paths 16, 18 are between the nodes 12, 14. Assume that both at the nodes 12, 14, the OPS 20 switch is set to the fiber path 16 at the receiving direction (port #4), the sequence of events with respect to time that takes place between the two OPS protected nodes is illustrated as follows. First, a fiber cut takes place on the TX fiber from the node 12 to the node 14 on the fiber path 16 (step 80-1). The OPS 20 active RX port goes into the LOS state (step 80-2). The messaging framework process 50 prevents the automatic switching of the OPS 20 to the other switch port. The pre-amplifier goes into shutoff state at the node 14.

At the node 14, with the OSC 22 in the LOS condition and the pre-amplifier in the shutoff state (due to low power, the amplifier shuts off), the node 14 raises the link FDI flag to notify the forward direction nodes of the fault (step 80-3). The link FDI flag is propagated until it reaches an optical section boundary, or a node with OPS protection, whichever comes first (in this case, the node 12). If the OPS 20 is present to protect against fiber faults, the node 16 converts the link FDI flag to the OPSI status and switches the OPS 20 to the other RX to the fiber path 18 (step 80-4). That is, instead of allowing the OPS 20 to blindly switch to the other RX port just based on the LOS detection on the active port, the messaging framework process 50 switches the OPS 20 to the other RX port, only when either an OPSI flag is locally raised, or received from an upstream node and the other RX port is not in LOS state. The link FDI flag is terminated at the node 14.

Assuming there is no fiber fault on the fiber path 18, power should be present at the other OPS RX port at the node 14, and switching the OPS 20 should clear the shutoff condition at pre-amplifier (step 80-5). The node 14 sends the OPSI status and associated switch port number, e.g., OPSI <6> in the reverse direction (step 80-6). The OPSI flag is propagated from node to node using the messaging infrastructure until the flag reaches the node 12 protected with the OPS 20. At the far end, the node 12 receives the OPSI <#> status, and triggers a switch to the same port, e.g. <6>, on the OPS 20 (step 80-7). At this state, both the nodes 12, 14 are successfully switched to fiber pair path 2, and traffic has now been fully recovered.

In addition to switching the OPS from one fiber path 16, 18 to the other, the messaging framework process 50 also uses the switch indication to trigger pre-loading path specific gain and loss settings on corresponding actuators and associated transponder parameters, if any. For example, at the network setup illustrated in FIG. 3, typically at each node 12, 14, the pre-amplifier gain is adjusted to compensate for the incoming span loss. At the nodes 12, 14, when the OPS 20 switches from one RX port to another, the proposed messaging framework process 50 knows the OPS 20 protection in place, monitors the total power received at each RX port of the OPS 20, takes the received power delta in account between two RX ports (in this example, port 4 and port 3), and uses the OPS switch indication to trigger a change in the gain of the pre-amplifier by that measured power delta amount. Similarly, on the transmit (RX) direction if the fiber type is different and requires different launch power target to minimize non-linear propagation penalties or to improve OSNR compared to one fiber path to the other, then the messaging framework process 50 allows to pre-program such delta during node installation time frame, and such delta can be used to re-adjust the post-amplifier gain targets or per channel actuator attenuation settings following the switch in the OPS 20.

In this way, the messaging framework process 50 avoids any overshoot or undershoot in downstream spans due to incoming path loss variations between protected fiber paths 16, 18 as well as minimized performance penalties due to fiber type and loss variations.

In addition, at the initial state of topology discovery, when each node 12, 14 discovers the presence of neighboring nodes using the existing messaging infrastructure, each OPS protected node sends out the OPSI status flag in reverse direction, and if the local switch port location does not match with the far end switch port location (received through OPSI status flag), then each OPS protected node raises a user-visible OPS switch mismatch warning or alarm. This way, the messaging framework process 50 ensures the OPS 20 switches at both ends is in-sync at initial network deployment condition. While the OPS switch ports are in-sync, the messaging framework process 50 allows each locally associated TX/RX (transmit/receive) to save path specific characteristics for receivers (RX) such as Polarization Mode Dispersion (PMD), Dynamic Group Delay (DGD), Polarization Dependent Loss (PDL), or path specific requirements for transmitters (TX) such as line and baud rate, viable modulation formats, transmit power so that these settings can be pre-loaded at TX/RX if necessary both to reduce RX re-acquisition time and avoiding manual path specific usage settings on the TX.

Other than fiber cuts, for other traffic affecting line faults, such as the Automatic Power Reduction (APR) events on the amplifiers 24 due to high back reflection and laser safety, or due to high fiber loss events on the span, or even for photonic circuit pack fail events, the messaging framework process 50 can be used to trigger optical switch at both ends from one fiber path 16, 18 to another. Also, compared to conventional approaches, where a manual OPS switch is required during fiber fault repair states, the messaging framework process 50 avoids unnecessary traffic disruption by avoiding that manual switch before fiber fault recovery.

In terms of generating the OPSI flag, in the illustration examples, the method used OPS switch port number to associate with the flag. An alternate option is to assign a logical path identifier for each fiber path that is unique to the set of redundant fiber paths and maintained the same path id at both OPS protected nodes. In such case, at the switch at one end, the node associates the logical fiber path id with the OPSI flag to propagate that to the reverse end. The advantage of using this scheme of its usability in 1+N fiber protection setups, where N is the number of redundant fiber paths.

For illustration purposes, the messaging framework process 50 relies on messaging infrastructure from node to node using signaling between switches with a communication channel that is out-of-band with respect to the traffic being protected such as the OSC 22. However, the messaging framework process 50 can work with other communication techniques as well, such as the General Communication Channel (GCC) in Optical Transport Network (OTN).

Figure 4:
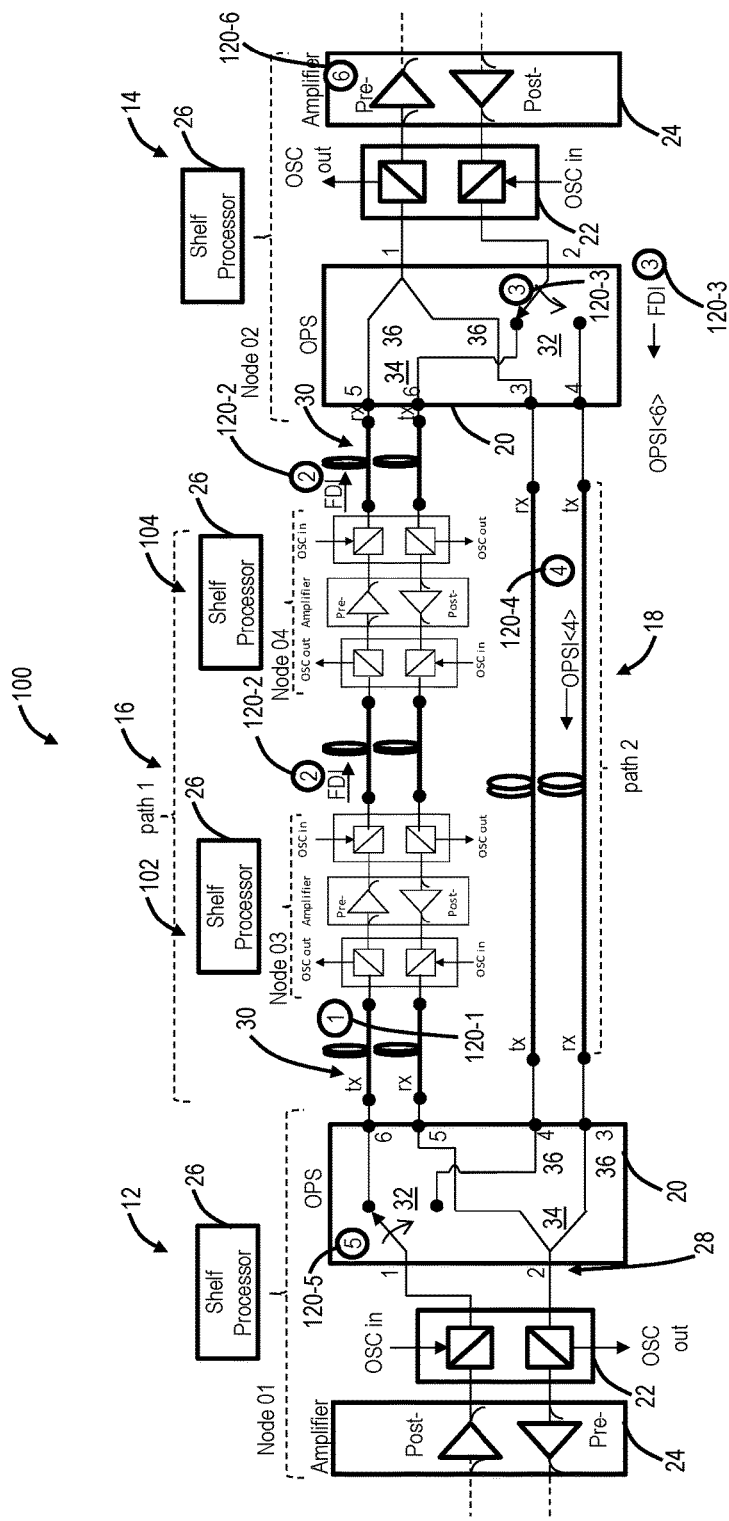
FIG. 4 is a network diagram of a network with different length fiber paths implementing the messaging framework process of FIG. 2.

Referring to FIG. 4, in an exemplary embodiment, a network diagram illustrates a network 100 with different length fiber paths 16, 18 implementing the messaging framework process 50. Here, the fiber path 16 includes intermediate amplifier nodes 102, 104 which can participate in the messaging infrastructure, but which do not include OPSs 20. The responsibility of the intermediate amplifier nodes 102, 104 is to relay the link FDI flag to downstream nodes. Using the messaging framework process 50, it is possible to achieve fiber path protection between two nodes even if the OPS 20 switch is configured at the transmitting direction, or both at transmit and receive direction. The workflow of the messaging framework process 50 in such protection configuration is illustrated in the network 100, where the nodes 12, 14 are protected with two different fiber paths 16, 18. Each fiber path 16, 18 is significantly diversified in characteristics from the other path. For illustration purposes, the path 16 contains additional nodes such as the intermediate amplifier nodes 102, 104 between the nodes 12, 14, while the path 18 is a direct fiber span connection between the nodes 12, 14. To illustrate, assume that at the nodes 12, 14, the OPS 20 switch is set to the fiber path 16 at the transmitting (TX) direction (port #6).

For illustration purposes, a fiber cut takes place in the direction from the node 12 to the node 102 in the fiber path 16 (step 120-1). At the node 102, with the OSC 22 in an LOS condition and the pre-amplifier in shutoff, the node 102 raises a link FDI flag to notify fiber fault condition to forward direction nodes. The link FDI flag is propagated from node to node until it hits an optical section boundary, or a node with OPS protection for fiber paths, whichever comes first, here the node 14. The node 14 receives the link FDI flag. Since the OPS 20 is present to protect against fiber faults, the node 14 converts the link FDI flag to an OPSI status, and switch the OPS 20 at the transmitting direction to the fiber path 18 (step 120-2). The pre-amplifier stays in shutoff state at this point at the node 14. The node 14 sends the OPSI status and associated switch port number, e.g., OPSI <4>, in the reverse direction (step 120-3). The OPSI status flag is propagated in reverse direction from node to node using the messaging infrastructure until the flag reaches a node protected with OPS (e.g., the node 12) (step 120-4). At the far end, the node 12 receives the OPSI <#> status and triggers the TX switch to the same port, e.g., <4> (step 120-5). At this stage, at the node 14, the OSC LOS and LOF conditions clear, and the pre-amplifies comes out of shutoff state, and traffic gets restored in both directions (step 120-6).

In such configuration (where the OPS switch is configured for the TX direction), amplifier gain and actuator loss settings for each path are pre-saved during topology discovery state or during installation time and later updated when a path becomes active, and those path specific gain, loss for photonic actuators, and non-linear value settings for TX/RX are used when the OPS switch takes place following the receipt of link-FDI or OPSI status flag.

There are few advantages and disadvantages of placing the optical protection switch in the transmit direction. For example, the task of shutting off power into the failed path (for eye safety) is addressed in such configuration by switching away light from the faulted fiber path, although the head-end switch has to be blind due to inability to detect viability of the protection path since there is no signal feeding into it, in addition to timing overhead compared to a tail-end switch. However, the key point is, the messaging framework process 50 to sync-up optical switches and loading path specific characteristics at two distinct nodes to protect against fiber path faults works regardless if the optical switch is placed at the transmit (head-end) or at the receive (tail-end) or at both, and for both 1+1 and 1+N fiber path protection schemes, where N is the number of redundant protection fiber paths.

Process of Synchronizing Optical Protection Switching

Figure 5:
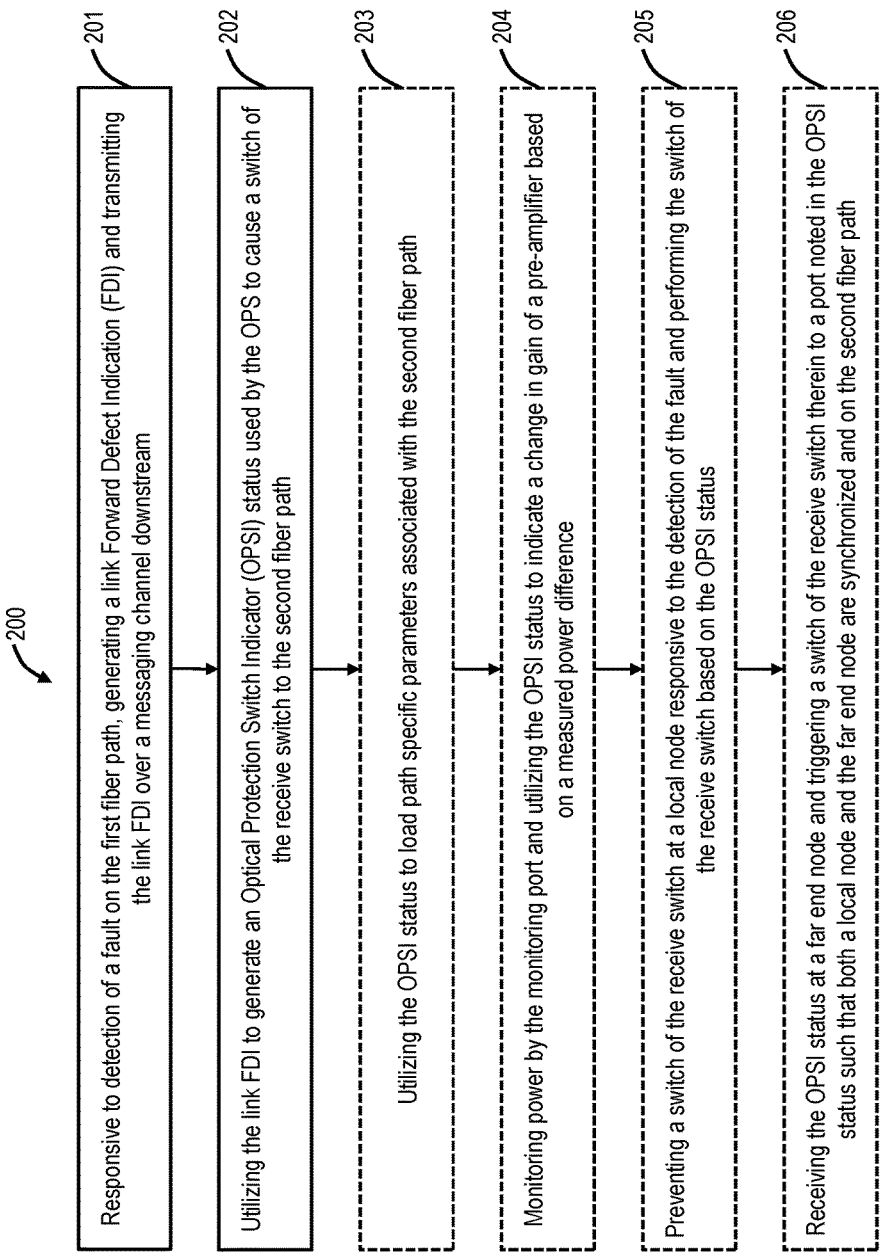
FIG. 5 is a flowchart of a process of synchronizing optical protection switching.

Referring to FIG. 5, in an exemplary embodiment, a flowchart illustrates a process 200 of synchronizing optical protection switching. The process 200 uses an Optical Protection Switch (OPS) including a splitter on a transmit side to both a first fiber path and a second fiber path and a receive switch and monitoring port on a receive side with the receive switch set to only one of the first fiber path and the second fiber path. The process 200 includes, responsive to detection of a fault on the first fiber path, generating a link Forward Defect Indication (FDI) and transmitting the link FDI over a messaging channel downstream (step 201); and utilizing the link FDI to generate an Optical Protection Switch Indicator (OPSI) status used by the OPS to cause a switch of the receive switch to the second fiber path (step 202).

The process 200 can include utilizing the OPSI status to load path specific parameters associated with the second fiber path (step 203). The path specific parameters can include settings on transceivers for any of Polarization Mode Dispersion (PMD), Dynamic Group Delay (DGD), Polarization Dependent Loss (PDL), required line and baud rate, viable modulation formats, and transmit power to be used for the second fiber path. The process 200 can include monitoring power by the monitoring port and utilizing the OPSI status to indicate a change in gain of a pre-amplifier based on a measured power difference (step 204). In a transmit direction, the path specific parameters can include one or more of amplifier gain and actuator settings for each path, wherein the path specific parameters are saved during installation, and wherein the path specific parameters are loaded based on the OPSI status.

The process 200 can include preventing a switch of the receive switch at a local node responsive to the detection of the fault and performing the switch of the receive switch based on the OPSI status (step 205). The process 200 can include receiving the OPSI status at a far end node and triggering a switch of the receive switch therein to a port noted in the OPSI status such that both a local node and the far end node are synchronized and on the second fiber path (step 206). The monitoring port can be utilized for the detection and the OPSI status can be used for the switch of the receive switch. The messaging channel can include one of an Optical Supervisory Channel (OSC) and General Communication Channel (GCC) bytes in overhead. The detection can be from a receiving node on the first fiber path and the receiving node generates the link FDI and the OPSI status. The detection can be from an intermediate node on the first fiber path and the intermediate node generates the link FDI and a receiving node generates the OPSI status.

In another exemplary embodiment, an optical network with at least two nodes configured to synchronize optical protection switching with an Optical Protection Switch (OPS) includes a first node including a first OPS and a second node including a second OPS, each of the first OPS and the second OPS include a splitter on a transmit side to both a first fiber path and a second fiber path and a receive switch and monitoring port on a receive side with the receive switch set to only one of the first fiber path and the second fiber path, wherein the first node is configured to, responsive to detection of a fault on the first fiber path, generate a link Forward Defect Indication (FDI) and transmit the link FDI over a messaging channel downstream, and utilize the link FDI to generate an Optical Protection Switch Indicator (OPSI) status used by the first OPS to cause a switch of the receive switch to the second fiber path.

In a further exemplary embodiment, an optical node configured to synchronize optical protection switching of an Optical Protection Switch (OPS) with another node includes the OPS including a splitter on a transmit side to both a first fiber path and a second fiber path and a receive switch and monitoring port on a receive side with the receive switch set to only one of the first fiber path and the second fiber path; a shelf processor communicatively coupled to the OPS; and a messaging channel system, wherein the optical node is configured to, responsive to detection of a fault on the first fiber path, generate a link Forward Defect Indication (FDI) and transmit the link FDI over the messaging channel system downstream, and utilize the link FDI to generate an Optical Protection Switch Indicator (OPSI) status used by the OPS to cause a switch of the receive switch to the second fiber path.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of synchronizing optical protection switching with an Optical Protection Switch (OPS) including a splitter on a transmit side to both a first fiber path and a second fiber path, and a receive switch and monitoring port on a receive side with the receive switch set to only one of the first fiber path and the second fiber path, the method comprising:
responsive to detection of a fault on the first fiber path, generating a link Forward Defect Indication (FDI) and transmitting the link FDI over a messaging channel downstream; and
utilizing the link FDI to generate an Optical Protection Switch Indicator (OPSI) status used by the OPS to cause a switch of the receive switch to the second fiber path.

2. The method of claim 1, further comprising:
utilizing the OPSI status to load path specific parameters associated with the second fiber path.

3. The method of claim 2, wherein the path specific parameters comprise settings on transceivers for any of Polarization Mode Dispersion (PMD), Dynamic Group Delay (DGD), Polarization Dependent Loss (PDL), line and baud rate, viable modulation formats, and transmit power to be used for the second fiber path.

4. The method of claim 2, further comprising:
monitoring power by the monitoring port and utilizing the OPSI status to indicate a change in gain of a pre-amplifier based on a measured power difference.

5. The method of claim 2, wherein, in a transmit direction, the path specific parameters comprise one or more of amplifier gain and actuator settings for each path, wherein the path specific parameters are saved during installation, and wherein the path specific parameters are loaded based on the OPSI status.

6. The method of claim 1, further comprising:
preventing a switch of the receive switch at a local node responsive to the detection of the fault and performing the switch of the receive switch based on the OPSI status.

7. The method of claim 1, further comprising:
receiving the OPSI status at a far end node and triggering a switch of the receive switch therein to a port noted in the OPSI status such that both a local node and the far end node are synchronized and on the second fiber path.

8. The method of claim 1, wherein the monitoring port is utilized for the detection and the OPSI status is used for the switch of the receive switch.

9. The method of claim 1, wherein the messaging channel comprises one of an Optical Supervisory Channel (OSC) and General Communication Channel (GCC) bytes in overhead.

10. The method of claim 1, wherein the detection is from a receiving node on the first fiber path and the receiving node generates the link FDI and the OPSI status.

11. The method of claim 1, wherein the detection is from an intermediate node on the first fiber path, and the intermediate node generates the link FDI and a receiving node generates the OPSI status.

12. An optical network with at least two nodes configured to synchronize optical protection switching with an Optical Protection Switch (OPS), the optical network comprising:
a first node including a first OPS and a second node including a second OPS, each of the first OPS and the second OPS includes a splitter on a transmit side to both a first fiber path and a second fiber path, and a receive switch and monitoring port on a receive side with the receive switch set to only one of the first fiber path and the second fiber path,
wherein the first node is configured to, responsive to detection of a fault on the first fiber path, generate a link Forward Defect Indication (FDI) and transmit the link FDI over a messaging channel downstream, and utilize the link FDI to generate an Optical Protection Switch Indicator (OPSI) status used by the first OPS to cause a switch of the receive switch to the second fiber path.

13. The optical network of claim 12, wherein the first node is further configured to utilize the OPSI status to load path specific parameters associated with the second fiber path.

14. The optical network of claim 13, wherein the path specific parameters comprise settings on transceivers for any of Polarization Mode Dispersion (PMD), Dynamic Group Delay (DGD), Polarization Dependent Loss (PDL), required line and baud rate, viable modulation formats, and transmit power to be used for the second fiber path.

15. The optical network of claim 13, wherein the first node is further configured to monitor power by the monitoring port and utilizing the OPSI status to indicate a change in gain of a pre-amplifier based on a measured power difference.

16. The optical network of claim 12, wherein the first node is further configured to prevent a switch of the receive switch at a local node responsive to the detection of the fault and performing the switch of the receive switch based on the OPSI status.

17. The optical network of claim 12, wherein the second node is configured to receive the OPSI status and trigger a switch of the receive switch therein to a port noted in the OPSI status such that both the first node and the second node are synchronized and on the second fiber path.

18. The optical network of claim 12, wherein the monitoring port is utilized for the detection and the OPSI status is used for the switch of the receive switch.

19. The optical network of claim 12, wherein the messaging channel comprises one of an Optical Supervisory Channel (OSC) and General Communication Channel (GCC) bytes in overhead.

20. An optical node configured to synchronize optical protection switching of an Optical Protection Switch (OPS) with another node, the optical node comprising:
the OPS including a splitter on a transmit side to both a first fiber path and a second fiber path, and a receive switch and monitoring port on a receive side with the receive switch set to only one of the first fiber path and the second fiber path;
a shelf processor communicatively coupled to the OPS; and
a messaging channel system,
wherein the optical node is configured to, responsive to detection of a fault on the first fiber path, generate a link Forward Defect Indication (FDI) and transmit the link FDI over the messaging channel system downstream, and utilize the link FDI to generate an Optical Protection Switch Indicator (OPSI) status used by the OPS to cause a switch of the receive switch to the second fiber path.

* * * * *